United States Patent [19]

Graton

[11] Patent Number: 4,580,673

[45] Date of Patent: Apr. 8, 1986

[54] CLUTCH DISC FOR AUTOMOTIVE CLUTCHES

[75] Inventor: Michel Graton, Paris, France

[73] Assignee: Valeo, Paris, France

[21] Appl. No.: 633,875

[22] Filed: Jul. 24, 1984

[30] Foreign Application Priority Data

Jul. 25, 1983 [FR] France .................................. 83 12286

[51] Int. Cl.⁴ .............................................. F16D 13/60
[52] U.S. Cl. ............................ 192/107 R; 192/107 C; 188/218 XL; 188/250 G
[58] Field of Search ........................ 192/107 R, 107 C; 188/218 XL, 250 G, 73.2

[56] References Cited

U.S. PATENT DOCUMENTS

| | | | |
|---|---|---|---|
| 1,950,977 | 3/1934 | Evans | 188/234 |
| 3,685,623 | 8/1972 | Bradshaw | 188/218 XL |
| 3,857,469 | 12/1974 | Stimson | 188/218 XL |
| 3,921,777 | 7/1974 | Rist | 192/107 |

FOREIGN PATENT DOCUMENTS

| | | |
|---|---|---|
| 1780124 | 12/1971 | Fed. Rep. of Germany . |
| 2712887 | 4/1978 | Fed. Rep. of Germany . |
| 1304067 | 8/1962 | France . |
| 1340798 | 9/1963 | France ........................ 188/218 XL |
| 2210245 | 7/1974 | France . |
| 940618 | 10/1963 | United Kingdom . |

Primary Examiner—Larry I. Schwartz
Attorney, Agent, or Firm—Charles E. Brown; Charles A. Brown

[57] ABSTRACT

A friction clutch disc comprises an annular support plate and annular friction facings on the respective sides of the support plate. Bores in the friction facings are generally in axial alignment with openings in said support plate, and rivets secure the respective friction facings to the support plate through pairs of aligned bores and openings. Each rivet comprises a shank, a first head at one end of the shank bearing against a transverse, and preferably flared, shoulder adjacent the axially inner end of the associated bore and a second head at the other end of the shank bearing against the support plate around the margin defining the associated opening therein. An annular protrusion coaxial with each of the bores in at least one of the friction facings is axially in alignment with and inwardly of the associated shoulder and is at least partly received in the associated opening in the support plate.

7 Claims, 2 Drawing Figures

CLUTCH DISC FOR AUTOMOTIVE CLUTCHES

FIELD OF THE INVENTION

The present invention relates generally to friction clutch discs, and more particularly to clutch discs for automotive clutches.

BACKGROUND OF THE INVENTION

As is known a friction clutch disc comprises an annular support plate which may be circumferentially divided up into a plurality of segments, and two annular friction facings disposed on opposite sides along an outer peripheral region of the annular plate which may also be divided into segments, each one of the friction facings being fixed to the plate segments at spaced locations by fixing means.

The annular plate is fitted with a hub, either directly or by the medium of a torsion damping assembly. Such a clutch disc is adapted to be mounted on a shaft and in a motor vehicle it is normally the transmission input shaft.

By means of the friction facings the clutch disc is adapted to be clamped for rotation with another shaft, axially between two places fixed for rotation with the other shaft which in a motor vehicle is normally the engine output shaft.

In any event the means for fixing the friction facings to the annular support plate are most commonly rivets.

The rivets alternately secure each one of the friction facings, accommodated in alignment with recesses formed in the other of the friction facings for assembly.

Each of the rivets comprises, in practice, a shank which extends substantially axially through a bore formed in the friction facing that is to be fixed to the annular support plate and through an opening in the support plate. The rivets further comprise a first head at one end which bears against a generally transverse shoulder at the axially inner end of the bore in the friction facing and a second head at the other outer end of the shank which bears against the annular support plate.

Such an arrangement is for example disclosed, in combination with other features, in U.S. Pat. No. 3,921,777 assigned to the assignee of the present application.

In practice, for the sought after securement of the friction facings, each of the rivets necessarily clamps under its first head, and between the first head and the annular support plate, a not insubstantial thickness of the friction facing being secured, which thickness depends on the upsetting distance to take into account.

This thickness which up to the present has run from the face of the support plate against which the friction facing to be fixed is applied together with the thickness of the first head defines a lost thickness or unusable part of the facing. The effective thickness of the friction facing is reduced correspondingly. The maximum possible wear of such a friction facing is limited to the axially outer part of the friction facing down to the head of the corresponding rivet.

For this reason friction facings are typically extra thick with respect to the thickness which is actually required for wear. Consequently, the friction facings require a surplus friction material for their manufacture, and in operation their superfluous rotating mass produces additional inertia which may cause excessive fatigue of at least some of the components arranged after the clutch disc along the kinematic chain and in particular synchronizers which customarily equip the associated gearbox, to the detriment of the service life thereof.

OBJECT AND SUMMARY OF THE INVENTION

The present invention relates generally to an improved riveting arrangement which reduces these drawbacks.

According to the invention there is provided a friction clutch disc, in particular for an automotive clutch, which comprises an annular plate which may be divided circumferentially into a plurality of segments, and two annular friction facings disposed on respective sides of an outer peripheral region of the support plate, which friction facings may also be divided into segments. Each of the friction facings is fixed to the support plate by a plurality of rivets. The friction faces have spaced apart bores generally in alignment with openings in the support plate. The rivets fix the respective friction facings to the annular support plate through aligned pairs of bores and openings. The rivets have a shank, a first head at one end of the shank and a second head at the other end of the shank. The first head bears against the generally transverse shoulder adjacent the axially inner end of its associated bore and the second head bears against the support plate. According to the improvement of the invention at least one of the friction facings to be fixed to the support plate, and preferably both of the friction facings, has annular protrusions coaxial with its bores which extend axially inwardly of the transverse shoulders of its bores and the protrusions are at least partly received in the aligned openings in the support plate.

According to the invention at least a part of the thickness of one or both friction facings included between the heads is accommodated inside the openings in the support plate thereby reducing the thickness of one or both friction facings accordingly.

These and other features and advantages of the invention will become apparent from the description which follows, given by way of example, with reference to the accompanying schematic drawing.

DESCRIPTION OF THE PREFERRED EMBODIMENT

Figure 1:
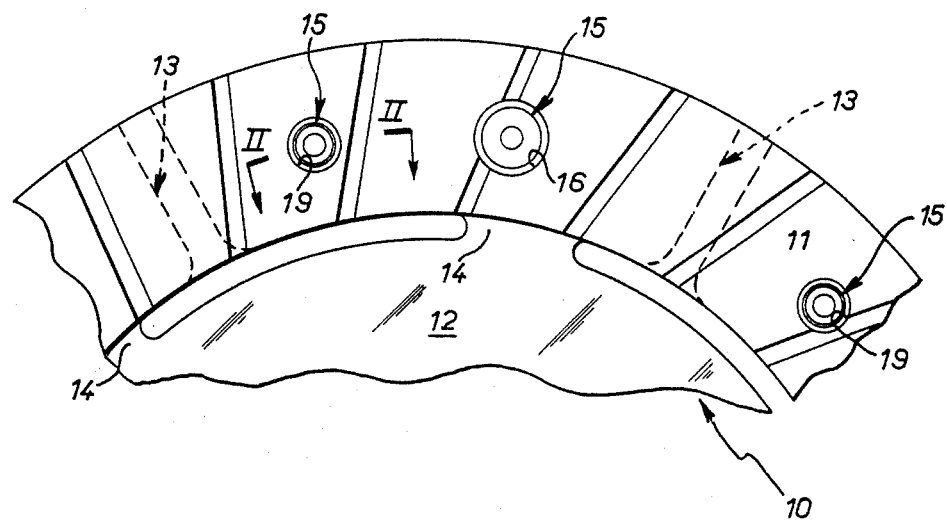
FIG. 1 is a fragmentary elevational view of a clutch friction disc embodying the invention, taken in the direction arrow I in FIG. 2.

As illustrated in the drawing, and known per se, a clutch friction disc comprises an annular support plate 10 and two annular friction facings 11 disposed on respective sides of an outer peripheral region of said support plate. In the illustrated embodiment, as is known per se, the annular support plate 10 comprises a circularly continuous inner region 12 which is adapted to be mounted on a hub (not shown) either directly or by the medium of a torsion damping assembly and an outer peripheral region circumferentially divided into segments 13.

Alternatively, the support plate 10 may comprise separate, individual segments thereby eliminating the separate inner region.

The friction facings 11 may also be divided circumferentially into separate segments corresponding to the segments of the annular support plate.

In the illustrated embodiment the segments 12 extend circumferentially more in one direction than in the other direction with respect to their base or foot 14, and are therefore asymmetrical. Alternatively, the circumferential extensions from the respective bases or feet 14 may be symmetrical.

As illustrated, and for the sake of simplification of the drawing, the segments 13 are assumed to be flat and to lie in the plane of the associated circumferentially continuous inner region 12.

Alternatively, and as is typically the case, gradual engagement of the clutch disc is sought and portions of the segments 12 are alternately cambered to opposite sides of the plane of the inner region 12. Such arrangements are well known in the art and as they are not part of the present invention need not be described in greater detail herein.

Likewise, as is known per se, each of the friction facings 11 is fixed at spaced locations to the support plate 10 and more particularly to the segments 12 thereof by means of rivets 15. In practice only one rivet 15 is provided for each segment of each of the friction facings 11. The rivets 15 for each segment 13 are circumferentially staggered with respect to each other.

Each of the rivets 15 is located at a cavity 16 in practice of circular contour, extending through the corresponding segment of the friction facing that is not fixed by the rivet. Each of the rivets 15 comprises a shank 18 which extends substantially axially through a bore 19 defined in the friction facing 11 that it is to fix to the support plate 10 and an opening 20 formed in the support plate generally in registry with the bore 19. Each of the rivets 15 further comprises at one of the ends of the shank 18 a first head 22 which bears against a generally transverse shoulder 23 adjacent the axially inner end of the bore 19 in the corresponding friction facing 11 and at the other end a second head 24 which bears against the corresponding segment 13 of the support plate 10 in registry with the cavity 16 formed in the other friction facing 11.

According to a feature of the invention at least one of the friction facings 11 to be fixed to the support plate 10 is provided with a discrete annular protrusion 25 coaxial with each bore 19 of the segments of the one friction facing 11, each protrusion extends in axial alignment with and axially inwardly of the transverse shoulder 23 of the associated bore, and is at least partly received in the aligned opening in the support plate.

In the illustrated embodiment the above arrangement is provided for each one of the friction facings 11.

Figure 2:
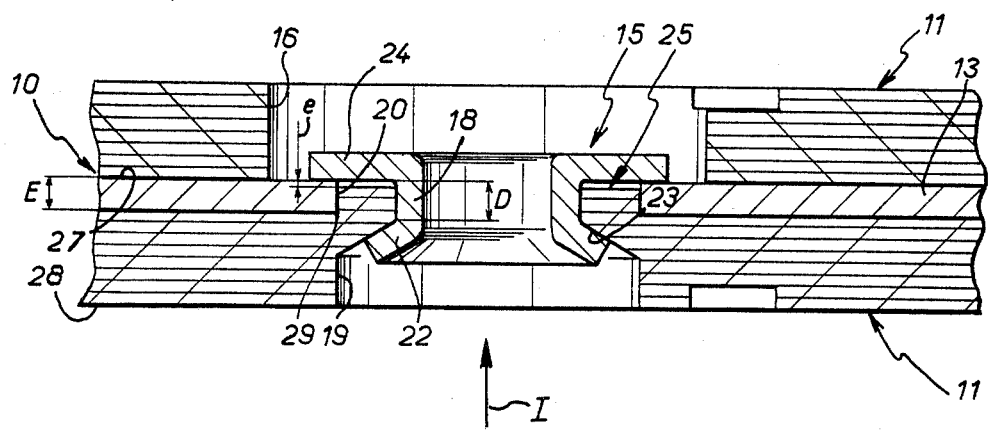
FIG. 2 is a larger scale chordal cross-sectional view taken along line II—II in FIG. 1.

In practice each one of the annular protrusions 24 extends axially through the greater part of the opening 20 or the thickness E of the support plate 10, with the free end of the annular protrusion 25 slightly recessed an amount e with respect to the remote side 27 of the support plate 10, FIG. 2.

This arrangement provides the requisite axial crimping dimension D between the first and second heads 22, 24 of each of the rivets 15, with the inevitable axial play, while the thickness E-e is advantageously subtracted from the wasted or lost thickness of the corresponding friction facing secured to the support plate 10.

By preference, and as shown, the generally transverse shoulder 23 provided on the friction facing for engagement with the first head 22 of the corresponding rivet 15 extends generally at an angle with respect to the axis of the bore 19 and flares axially outwardly toward the outer side 28 of the friction facing 11 fixed by the associated rivet 15.

Thus there is a sufficient thickness of friction facing material between the first head 22 of each of the rivets 15 and the edge 29 of the opening 20 through the corresponding support plate segment 13 while also providing a sufficient transverse extent for the first head 22 of the rivet 15.

In actual practice the heads 22 and 24 of each of the rivets 15 have undifferentiated functions, so that either head may function as a crimping tail end and the other may function as the actual rivet head.

Of course the present invention is not intended to be limited to the illustrated and described embodiment but includes all variations and alternatives understood to one skilled in the art.

In particular in the illustrated embodiment one of the rivet heads bears directly against the friction facing to be secured and the other rivet head bears directly against the support plate. It will be appreciated that the rivet heads may bear through the medium of any kind of washer or spacer member.

Finally, there may be provided for facilitating assembly radial play between each of the protrusions on the friction facings and the corresponding opening through the support plate and/or the corresponding rivet.

What is claimed is:

1. A friction clutch disc for an automotive clutch, said clutch disc comprising an annular support plate, two annular friction facings disposed on respective sides of an outer peripheral region of said support plate, said friction facings having spaced apart bores generally in alignment with openings in said support plate, a plurality of rivets fixing the respective friction facings to said support plate by passing through aligned pairs of said bores and openings, each of said rivets having an axial shank, a first head at one end of said shank bearing against a generally transverse shoulder on a first of said friction facings adjacent an axially inner end of its associated bore, and a second head at the other end of said shank bearing against said support plate, said first friction facing having annular protrusions coaxial with the associated ones of said bores therein and extending axially inwardly of said transverse shoulders, and said protrusions being at least partly received in the aligned openings in said support plate, said protrusions extending annularly between the shank of the associated rivet and the edge of the associated opening in said annular plate.

2. A friction clutch disc according to claim 1, wherein said protrusions extend axially through the greater part of the respective openings in said support plate, the free ends of the protrusions being slightly set back with respect to the side of said annular support plate in contact with the corresponding second rivet heads.

3. A friction clutch disc according to claim 1, wherein said transverse shoulders at the axially inner end of said bores are at an angle with respect to the axis of said bores and flare toward the axially outer side of said first friction facing.

4. A friction clutch disc according to claim 1, wherein said transverse shoulders and protrusions are provided on both of said friction facings.

5. A friction clutch disc according to claim 1, wherein said annular support plate has an outer peripheral region divided circumferentially into segments, said friction facings also being divided into segments, a said rivet fixing each friction facing segment to a corresponding segment of said outer peripheral region of said annular support plate.

6. A friction clutch disc according to claim 3, wherein each of said second rivet heads extends radially outwardly beyond its first head, each of said second heads bearing against the margin defining the associated opening in said support plate and each of said first head bearing along the flared shoulder of the associated bore.

7. A friction clutch disc according to claim 1, wherein said rivets are each of one-piece construction.

* * * * *